US010580285B2

(12) United States Patent
Nalukurthy et al.

(10) Patent No.: US 10,580,285 B2
(45) Date of Patent: *Mar. 3, 2020

(54) SYSTEMS AND METHODS FOR DOWNLOADING CONFIGURATION DATA TO FIRE ALARM CONTROL PANEL DEVICES AND PERIPHERAL DEVICES IN A FIRE ALARM SYSTEM

(71) Applicant: Honeywell International Inc., Morris Plains, NJ (US)

(72) Inventors: RajeshBabu Nalukurthy, Bangalore (IN); SivaSankar Mathuraju, Bangalore (IN); Aatish Sethi, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/365,302

(22) Filed: Mar. 26, 2019

(65) Prior Publication Data
US 2019/0221103 A1 Jul. 18, 2019

Related U.S. Application Data

(63) Continuation of application No. 15/671,366, filed on Aug. 8, 2017, now Pat. No. 10,242,553.

(51) Int. Cl.
*G08B 25/00* (2006.01)
*G08B 25/14* (2006.01)
(Continued)

(52) U.S. Cl.
CPC ......... *G08B 25/003* (2013.01); *G06F 15/167* (2013.01); *G08B 25/14* (2013.01);
(Continued)

(58) Field of Classification Search
CPC .......... G08B 7/062; G08B 7/06; G08B 17/10; G08B 25/006
(Continued)

(56) References Cited

U.S. PATENT DOCUMENTS 7,571,215 B2    8/2009  Jacobs et al.
7,869,478 B2    1/2011  Lee et al.
9,628,286 B1    4/2017  Nguyen et al.
(Continued)

FOREIGN PATENT DOCUMENTS

EP      1246401  A1    2/2002
WO      03073206 A2    9/2003
WO      2009121177 A1  10/2009

OTHER PUBLICATIONS

Extended European search report for corresponding EP patent application 18183627.1, dated Oct. 15, 2018.
(Continued)

*Primary Examiner* — Joseph H Feild
*Assistant Examiner* — Sharmin Akhter
(74) *Attorney, Agent, or Firm* — Brooks, Cameron & Huebsch, PLLC

(57) ABSTRACT

Systems and methods for downloading configuration data to control panel devices and peripheral devices in a connected system are provided. Some methods can include a master device in the connected system receiving and implementing a change to configuration data of the master device, the master device identifying the change to the configuration data of the master device, and the master device broadcasting a configuration message to a plurality of slave devices of the master device, wherein the configuration message can include the change to the configuration data of the master device.

20 Claims, 1 Drawing Sheet

(51) Int. Cl.
　　　*G06F 15/167*　　　(2006.01)
　　　*H04L 29/06*　　　(2006.01)
　　　*H04L 12/24*　　　(2006.01)
　　　*H04L 29/08*　　　(2006.01)

(52) U.S. Cl.
　　　CPC .......... *H04L 29/06* (2013.01); *H04L 41/0866* (2013.01); *H04L 67/1095* (2013.01); *H04L 41/082* (2013.01); *H04L 41/0889* (2013.01); *H04L 67/34* (2013.01)

(58) Field of Classification Search
　　　USPC .................. 340/12.28–12.29, 12.54, 286.05, 340/539.1–539.15
　　　See application file for complete search history.

(56) References Cited

U.S. PATENT DOCUMENTS

| | | |
|---|---|---|
| 2004/0186739 A1 | 9/2004 | Boiles et al. |
| 2009/0248967 A1 | 10/2009 | Sharma et al. |
| 2012/0098638 A1 | 4/2012 | Crawford |
| 2015/0142898 A1 | 5/2015 | Picolo, III |
| 2015/0194000 A1* | 7/2015 | Schoenfelder ..... G07C 9/00309 340/5.61 |
| 2016/0224500 A1 | 8/2016 | Pinn et al. |
| 2016/0352749 A1 | 12/2016 | Baumgarte et al. |

OTHER PUBLICATIONS

Communication pursuant to Article 94(3) EPC from related European Application No. 18183627, dated Jul. 31, 2019, 6 pages.

\* cited by examiner

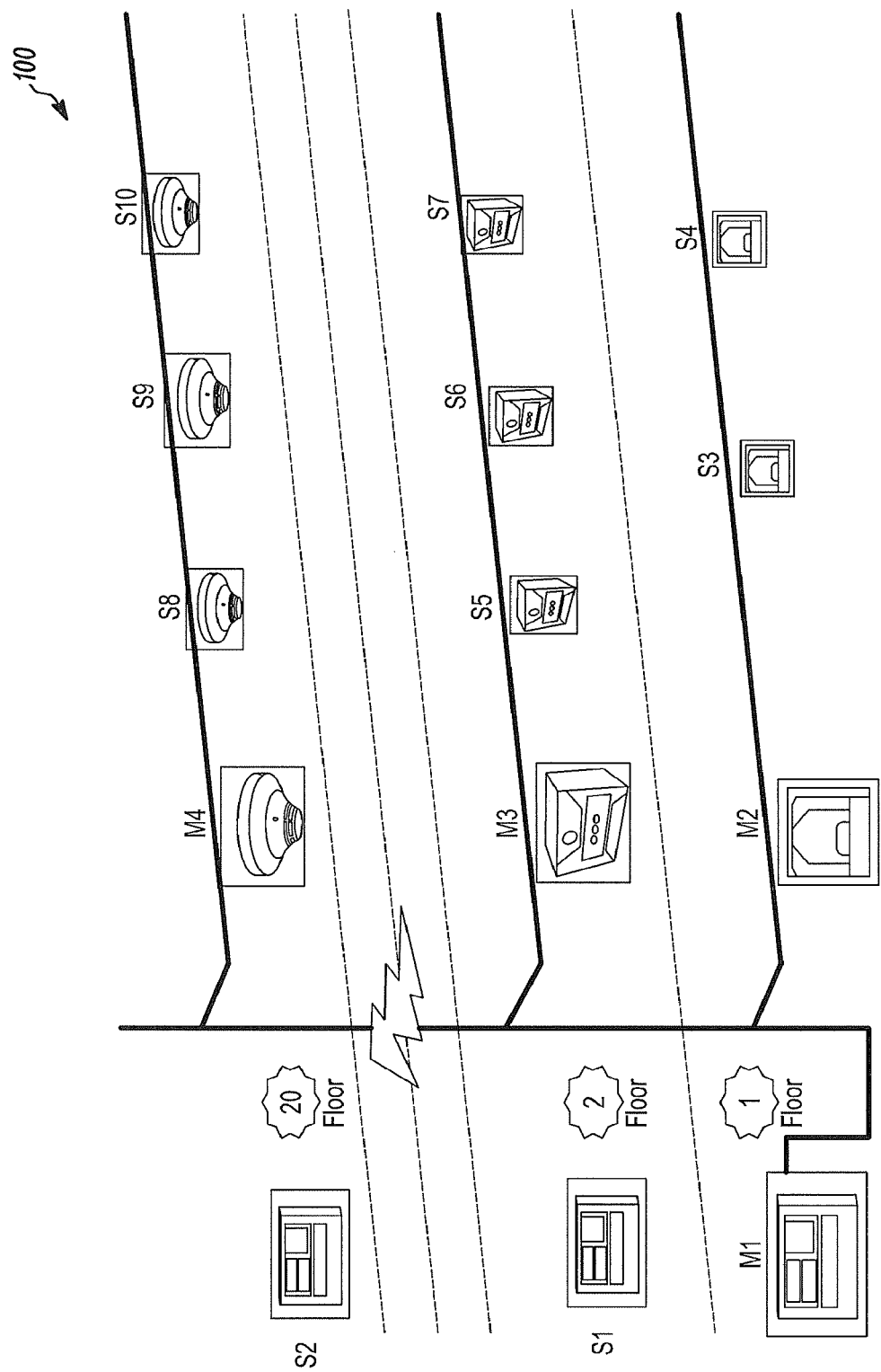

SYSTEMS AND METHODS FOR DOWNLOADING CONFIGURATION DATA TO FIRE ALARM CONTROL PANEL DEVICES AND PERIPHERAL DEVICES IN A FIRE ALARM SYSTEM

PRIORITY INFORMATION

This application is a Continuation of U.S. application Ser. No. 15/671,366, filed Aug. 8, 2017, now U.S. Pat. No. 10,242,553, issued Mar. 26, 2019, the contents of which are incorporated herein by reference.

FIELD

The present invention relates to fire alarm control panel devices and peripheral devices in a fire alarm system. More particularly, the present invention relates to systems and methods for downloading configuration data to the fire alarm control panel devices and the peripheral devices in the fire alarm system.

BACKGROUND

One of the most time consuming parts of commissioning a fire alarm system is downloading configuration data to fire alarm control panel devices and peripheral devices in the fire alarm system. Furthermore, due to a number of reasons, such as misunderstanding requirements, lack of knowledge of a site, owner recommendations, and the like, in large fire alarm systems with many fire alarm control panel devices and peripheral devices, it is common for there to be changes to the configuration data, such as panel settings and device settings, after the fire alarm system is commissioned. In these situations, a site engineer must be deployed onsite to update the configuration data in each of the fire alarm control panel devices and the peripheral devices on a one by one basis. However, this is a repetitive task that is prone to errors and that is costly due to the time intensive nature of the task.

In view of the above, there is a continuing, ongoing need for improved systems and methods.

BRIEF DESCRIPTION OF THE DRAWINGS

FIG. 1 is a block diagram of a system in accordance with disclosed embodiments.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for downloading configuration data to fire alarm control panel devices and peripheral devices in a fire alarm system. While systems and methods disclosed herein are described in connection with a fire alarm system, it is to be understood that systems and methods disclosed herein are not so limited. Instead, systems and methods disclosed herein could be used in connection with a gas detection system, an access control system, a security system, or any connected system with internet of things (IoT) devices.

In accordance with disclosed embodiments, all of the fire alarm control panel devices and the peripheral devices in the fire alarm system can be grouped into a master slave relationship. In this regard, a first fire alarm control panel device can be a master device for one or more slave devices, including one or more other fire alarm control panel devices and/or one or more peripheral devices. Furthermore, a first slave device can be the master device for one or more other slave devices. When a change is made to the configuration data in one master device, the change can be made known to each of the slave devices of that master device. That is, the fire alarm control panel devices and the peripheral devices in the fire alarm system can be organized in a cascade, and the configuration data can be cloned or replicated from the master device to each of the slave devices through the cascade.

In some embodiments, each of the master devices in the fire alarm system can identify when a change has been made to the configuration data of a respective one of the master devices. Responsive thereto, the respective one of the master devices can transmit or distribute the configuration data with the change or transmit or distribute only the change to the configuration data to all of the slave devices of the respective one of the master devices. For example, the respective one of the master devices can broadcast a configuration message over a wired or wireless network connecting the fire alarm system, the configuration message can include the configuration data with the change or only the change to the configuration data, and each of the slave devices of the respective one of the master devices can receive the configuration message and update the configuration data of a respective one of the slave devices accordingly.

In some embodiments, the network connecting the fire alarm system can include a cloud network, and a user can update the configuration data of the respective one of the master devices via the cloud network. In these embodiments, when the respective one of the master devices identifies the change to the configuration data of the respective one of the master devices, the respective one of the master devices can push the configuration message via the cloud network to each of the slave devices of the respective one of the master devices. In some embodiments, a site engineer can be onsite to authenticate the change to the configuration data before the configuration message is pushed to each of the slave devices.

In some embodiments, the user can update the respective one of the master devices via a USB device inserted into a respective USB port the respective one of the master devices, and the USB device can include the change to the configuration data. In these embodiments, the respective one of the master devices can read the change to the configuration data from the USB device and use the change to the configuration data to update itself and broadcast the configuration message as disclosed herein.

FIG. 1 is a block diagram of a system 100 in accordance with disclosed embodiments. As seen in FIG. 1, the system 100 can include the fire alarm control panel device M1 that can be the master device of three salve devices, including the peripheral device M2 and each of the fire alarm control panel devices S1, S2. Similarly, the peripheral device M2 can be the master device of two slave devices, including each of the peripheral devices S3, S4. The fire alarm control panel device S1 can be the master device of one slave device, including the peripheral device M3, and the peripheral device M3 can be the master device of three slave devices, including the peripheral devices S5, S6, S7. Finally, the fire alarm control panel device S2 can be the master device of one slave device, including the peripheral device M4, and the peripheral device M4 can be the master device of three slave devices, including the peripheral devices S8, S9, S10.

As seen in FIG. 1, in some embodiments, the fire alarm control panel devices M1, S1, S2 and the peripheral devices M2, M3, M4, S3, S4, S5, S6, S7, S8, S9, S10 in the fire alarm system 100 can be organized in a cascade. As further seen in FIG. 1, in some embodiments, the master slave relationship in the fire alarm system 100 can be 1:1 or 1:many, and the system 100 can include a plurality of master devices.

A user can update the configuration data of the fire alarm control panel device M1 as disclosed herein or as would be understood by one or ordinary skill in the art. Responsive thereto and in accordance with disclosed embodiments, the fire alarm control panel device M1 can identify a change to the configuration data of the fire alarm control panel device M1 and transmit, distribute, broadcast, or push the configuration message that includes the configuration data with the change or that includes only the change to the configuration data to the slave devices of the fire alarm control panel device M1, including the peripheral device M2 and each of the fire alarm control panel devices S1, S2. Similarly, upon receiving the configuration message, the peripheral device M2 can use the configuration message to update its configuration data and transmit, distribute, broadcast, or push the configuration message to the slave devices of the peripheral device M2, including the peripheral devices S3, S4. Upon receiving the configuration message, the fire alarm control panel device S1 can use the configuration message to update its configuration data and transmit, distribute, broadcast, or push the configuration message to the slave device of the fire alarm control panel device S1, including the peripheral device M3, which, in turn, can use the configuration message to update its configuration data and transmit, distribute, broadcast, or push the configuration message to the slave devices of the peripheral device M3, including the peripheral devices S5, S6, S7. Finally, upon receiving the configuration message, the fire alarm control panel device S2 can use the configuration message to update its configuration data and transmit, distribute, broadcast, or push the configuration message to the slave device of the fire alarm control panel device S2, including the peripheral device M4, which, in turn, can use the configuration message to update its configuration data and transmit, distribute, broadcast, or push the configuration message to the slave devices of the peripheral device M4, including the peripheral devices S8, S9, S10.

In some embodiments, the configuration message can include the change to the configuration data of less than all of the fire alarm control panel devices M1, S1, S2 and the peripheral devices M2, M3, M4, S3, S4, S5, S6, S7, S8, S9, S10 in the fire alarm system 100. For example, in some embodiments, the user can provide the configuration message to the fire alarm control panel device M1, but the configuration message may include the change to the configuration data of only the peripheral devices M2, M3, M4, S3, S4, S5, S6, S7, S8, S9, S10 and not the fire alarm control panel devices M1, S1, S2. In these embodiments, the fire alarm control panel device M1 can identify the configuration message or identify the change to the configuration data in the configuration message and transmit, distribute, broadcast, or push the configuration message to the slave devices of the fire alarm control panel device M1 without updating its own configuration data.

As seen in FIG. 1, in any embodiment, responsive to the user providing the configuration message to the one fire alarm control panel device M1, systems and methods disclosed herein can download and cascade the configuration message to all of the fire alarm control panel devices M1, S1, S2 and the peripheral devices M2, M3, M4, S3, S4, S5, S6, S7, S8, S9, S10 in the fire alarm system 100 that need the configuration message to update their configuration data, thereby saving and avoiding the time that would be needed to update each of the fire alarm control panel devices M1, S1, S2 and the peripheral devices M2, M3, M4, S3, S4, S5, S6, S7, S8, S9, S10 in the fire alarm system 100 on a one by one basis.

In some embodiments, systems and methods disclosed herein can provide the user with an audible or visual notification message that identifies which of the fire alarm control panel devices M1, S1, S2 and the peripheral devices M2, M3, M4, S3, S4, S5, S6, S7, S8, S9, S10 in the fire alarm system 100 updated their configuration data responsive to the configuration message.

It is to be understood that each of the fire alarm control panel devices M1, S1, S2 and the peripheral devices M2, M3, M4, S3, S4, S5, S6, S7, S8, S9, S10 in the fire alarm system 100 can include a respective transceiver device, a respective memory device, and a respective user interface device, each of which can be in communication with respective control circuitry, a respective programmable processor, and respective executable control software as would be understood by one of ordinary skill in the art. The respective executable control software can be stored on a transitory or non-transitory computer readable medium, including, but not limited to local computer memory, RAM, optical storage media, magnetic storage media, flash memory, and the like.

In some embodiments, the respective transceiver of a respective one of the fire alarm control panel devices M1, S1, S2 and the peripheral devices M2, M3, M4, S3, S4, S5, S6, S7, S8, S9, S10 can communicate with the respective transceiver of other ones of the fire alarm control panel devices M1, S1, S2 and the peripheral devices M2, M3, M4, S3, S4, S5, S6, S7, S8, S9, S10 via the wired or wireless network connecting the system 100. Furthermore, in some embodiments, the respective memory device can store the configuration data of the respective one of the fire alarm control panel devices M1, S1, S2 and the peripheral devices M2, M3, M4, S3, S4, S5, S6, S7, S8, S9, S10. Further still, in some embodiments, some or all of the respective control circuitry, the respective programmable processor, and the respective executable control software can execute and control at least some of the methods disclosed herein.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
    a master device in a connected system receiving an update to first configuration data of the connected system;

the master device determining that the update to the first configuration data includes a first change to second configuration data of the master device;
the master device updating the second configuration data to reflect the first change to the second configuration data;
the master device identifying a portion of the update to the first configuration data relevant to a first plurality of slave devices in the connected system;
the master device communicating a configuration message to each of the first plurality of slave devices, the configuration message including the identified relevant portion of the update to the first configuration data;
a first one of the first plurality of slave devices receiving the configuration message and responsive thereto, determining that the identified relevant portion of the update to the first configuration data includes a second change to third configuration data of the first one of the first plurality of slave devices; and
the first one of the first plurality of slave devices updating the third configuration data to reflect the second change to the third configuration data.

2. The method of claim 1, wherein the connected system includes one of a fire alarm system, a gas detection system, an access control system, a security system, or a plurality of IoT devices.

3. The method of claim 2, wherein the master device includes a control panel device, and wherein each of the first plurality of slave devices includes a peripheral device.

4. The method of claim 2, wherein the master device includes a first control panel device, and wherein at least one of the first plurality of slave devices includes a second control panel device.

5. The method of claim 1, wherein the method includes the first one of the first plurality of slave devices communicating the configuration message to a second plurality of slave devices in the connected system, the second plurality of slave devices being slaves of the first one of the first plurality of slave devices.

6. The method of claim 1, wherein the method includes the master device receiving the update to the first configuration data of the connected system via a network.

7. The method of claim 6, wherein the method includes the master device communicating the configuration message by pushing the configuration message to each of the first plurality of slave devices via the network.

8. The method of claim 1, wherein the method includes the master device reading the update to the first configuration data from a USB device inserted into a USB port of the master device.

9. The method of claim 1, further comprising a user interface device emitting an audible or visual notification message that identifies which of the master device and the first plurality of slave devices are updated in response to the master device receiving the update to the first configuration data.

10. The method of claim 1, wherein the method includes cascading the configuration message from the master device to each of the first plurality of slave devices.

11. A connected system comprising:
a master device; and
a first plurality of slave devices that are slaves of the master device,
wherein the master device is configured to:
receive an update to first configuration data of the connected system;
determine that the update to the first configuration data includes a first change to second configuration data of the master device;
update the second configuration data to reflect the first change to the second configuration data; and
identify portions of the update to the first configuration data that are relevant to the first plurality of slave devices and communicate a configuration message to the first plurality of slave devices, wherein the configuration message includes only the portions of the update to the first configuration data that are relevant to the first plurality of slave devices; and
wherein a first one of the first plurality of slave devices is configured to receive the configuration message and determine whether the portions of the update to the first configuration data include a second change to third configuration data of the first one of the first plurality of slave devices, and when the portions of the update to the first configuration data include the second change to the third configuration data, update the third configuration data to reflect the second change to the third configuration data.

12. The system of claim 11, wherein the system is one of a fire alarm system, a gas detection system, an access control system, a security system, and a plurality of IoT devices.

13. The system of claim 12, wherein the master device comprises a control panel device, and wherein each of the first plurality of slave devices comprises a peripheral device.

14. The system of claim 12, wherein the master device comprises a first control panel device, and wherein at least one of the first plurality of slave devices comprises a second control panel device.

15. The system of claim 11, wherein the master device is configured to receive the update to the first configuration data via a cloud network.

16. The system of claim 15, wherein the master device is configured to broadcast the configuration message by pushing the configuration message to each of the first plurality of slave devices via the cloud network.

17. The system of claim 11, wherein the master device is configured to read the update to the first configuration data from a USB device inserted into a USB port of the master device.

18. The system of claim 11, further comprising:
a respective user interface device associated with each of the master device and the first plurality of slave devices,
wherein the respective user interface device associated with each of the master device and the first plurality of slave devices is configured to emit a respective audible or visual notification message that identifies when a respective one of the master device and the first plurality of slave devices is updated in response to the master device receiving the update to the first configuration data of the connected system.

19. The system of claim 11, wherein the master device and the first plurality of slave devices form a cascade.

20. The system of claim 11, wherein the first one of the first plurality of slave devices is configured to communicate the configuration message to a second plurality of slave devices that are slave devices of the first one of the first plurality of slave devices.

* * * * *